United States Patent [19]

Weber et al.

[11] Patent Number: 5,288,427

[45] Date of Patent: Feb. 22, 1994

[54] ELECTROOPTICAL DISPLAY ELEMENT

[75] Inventors: Georg Weber, Erzhausen, Fed. Rep. of Germany; Bernhard Scheuble, Kanagawa, Japan; Rudolf Eidenschink, Bodenheim; Andreas Wächtler, Griesheim, both of Fed. Rep. of Germany

[73] Assignee: Merck Patent Gesellschaft mit Beschränkter Haftung, Darmstadt, Fed. Rep. of Germany

[21] Appl. No.: 815,832

[22] Filed: Dec. 24, 1991

Related U.S. Application Data

[63] Continuation of Ser. No. 272,831, filed as PCT/EP88/00090, Feb. 8, 1988, and published as WO 88/06178, Aug. 25, 1988, abandoned.

[30] Foreign Application Priority Data

Feb. 18, 1987 [DE] Fed. Rep. of Germany ....... 3705071

[51] Int. Cl.$^5$ .................. C09K 19/34; C09K 19/30; C09K 19/52
[52] U.S. Cl. .................. 252/299.61; 252/299.01; 252/299.6; 252/299.63; 359/105; 359/106
[58] Field of Search .................. 252/299.63, 299.01, 252/299.6; 359/105, 106

[56] References Cited

U.S. PATENT DOCUMENTS

| | | |
|---|---|---|
| 4,584,120 | 4/1986 | Fujii et al. ............ 252/299.63 |
| 4,622,162 | 11/1986 | Kimura et al. ......... 252/299.63 |
| 4,654,162 | 3/1987 | Sugimori et al. ....... 252/299.63 |
| 4,759,870 | 7/1988 | Fujimura ............... 252/299.63 |
| 4,788,000 | 11/1988 | Ishii et al. ............ 252/299.61 |
| 4,943,384 | 7/1990 | Sucrow et al. ......... 252/299.61 |
| 5,013,478 | 5/1991 | Petrzilka .............. 252/299.63 |
| 5,030,383 | 7/1991 | Scheuble .............. 252/299.63 |

FOREIGN PATENT DOCUMENTS

| | | |
|---|---|---|
| 3510432 | 9/1986 | Fed. Rep. of Germany ........ 252/299.63 |
| 3510434 | 9/1986 | Fed. Rep. of Germany ........ 252/299.63 |
| 2070594 | 9/1981 | United Kingdom ........ 252/299.63 |
| 2108963 | 5/1983 | United Kingdom ........ 252/299.63 |

OTHER PUBLICATIONS

Gooch et al., "The Optical Properties of Twisted . . . angles≦90'" J. Phys. D: Appl. Phys. vol. 8, 1975, Printed in G.B., 1975, pp. 1575–1584.

Primary Examiner—Robert L. Stoll
Assistant Examiner—Philip Tucker
Attorney, Agent, or Firm—Millen, White, Zelano & Branigan

[57] ABSTRACT

Compounds of the formula I $$R^1-A^1-Z^1-A-O-R^2$$

in which
$R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one anther, or one of the two groups $R^1$ and $R^2$ is alternatively H,
$Z^1$ is —$CH_2$—O—, —$OCH_2$—, —$CH_2CH_2$— or a single bond,
$A^1$ is trans-1,4-cyclohexylene in which, in addition one or two nonadjacent $CH_2$ groups may be replaced by O and/or S, or 1,4-cyclohexenylene, and
A is unsubstituted or fluorine-substituted 1,4-phenylene, can be used as components of liquid-crystalline dielectrics containing at least three liquid-crystalline compounds for shortening the switch-on time $T_{on}$ of electrooptical display elements based on a TN cell on switching the voltage from a first voltage below or approximately at the threshold voltage to a second voltage on the increase of the electrooptical characteristic line.

13 Claims, No Drawings

ELECTROOPTICAL DISPLAY ELEMENT

This application is a continuation, of application Ser. No. 07/272,831, filed Oct. 17, 1988, which is based on PCT/EP88/00090 filed Feb. 8, 1988, now abandoned.

The invention relates to electrooptical liquid-crystal display elements (LC display elements) based on TN cells having a particularly short switch-on time $T_{on}$ when switched from a first voltage below or approximately at the threshold voltage to a second voltage which is on the increase of the electrooptical characteristic line. The invention is thus of particular importance in high-multiplex LC display elements and in particular in TFT-addressed LC display elements having a particularly short switch-on time.

For LC display elements, the properties of nematic or nematic cholesteric liquid-crystalline materials to modify their optical properties, such as light absorption, light scattering, birefringence, reflectivity or color are utilized. At the same time, the function of display elements of this type is based, for example, on the phenomena of dynamic scattering and the deformation of allied phases, on the guest-host effect, the Schadt-Helfrich effect in the twisted cell, the SBE effect or the cholesteric-nematic phase transition.

For industrial use of these effects in electronic components, LC phases are required which must satisfy a large number of requirements. Particularly, important here are the chemical resistance to moisture, air and physical influences, such as heat, radiation in the infrared, visible and ultra-violet region and electrical direct current and alternating current fields. Furthermore, a liquid-crystalline mesophase in a suitable temperature range, low viscosity, an optical anisotropy matched to the layer thickness, low temperature dependence of the threshold voltage, steep gradients of the electrooptical characteristic line and adequate dissolution capacity for pleochroic dyes are required of LC phases which can be used industrially.

In none of the series of compounds having a liquid-crystalline mesophase known hitherto is there a single compound which satisfies all these requirements. Generally, therefore, mixtures of two to 25, preferably three to 18, compounds are prepared in order to obtain substances which can be used as LC phases. However, ideal phases cannot easily be produced in this way since components of high melting and clear points frequently also confer high viscosity on the mixtures. The switching times of the electrooptical display elements produced therewith are thereby altered in an undesired manner.

In order to shorten the switching times, components of low viscosity or glass-transition temperatures and/or particularly advantageous elastic constants are employed in the LC phases known hitherto. However, these phases do not simultaneously satisfy all the above-mentioned requirements. In particular, their switch-on time $T_{on}$ is, as before, still too long for many applications, in particular in LC display elements in which the switchover takes place from a first voltage below or approximately at the threshold voltage to a second voltage on the increase of the electrooptical characteristic line.

An essential distinction is made in electrooptical liquid-crystal display elements between static drive and multiplex drive. In order to switch on in the case of static drive, the voltage is switched from 0 volts to a voltage approximately at or above the saturation voltage (=the voltage with which 90% of the maximum contrast is obtained). On switching off, the voltage is switched back to 0 volts. In electrooptical liquid-crystal display elements which are driven in "multiplex operation", the voltage is switched from a first voltage V (off) to a second voltage V (on) and back. The ratio between these two voltages is determined by the "multiplex ratio" and the "bias". The absolute values for the two voltages are given by the operating voltage.

N=the number of "multiplex" lines (1/N=multiplex ratio)

$$\frac{V(on)}{V(off)} = \left(\frac{\sqrt{N}+1}{\sqrt{N}-1}\right)^{\frac{1}{2}}$$

$$V(on) = \frac{Batt.\ volt.}{a \cdot \sqrt{\frac{n}{N+(a^2-1)}}}$$

$$V(off) = \frac{Batt.\ volt.}{a \cdot \sqrt{\frac{N}{N+((a-2)^2-1)}}}$$

At a multiplex ratio of 1:4 and a bias of 1:3, for example, the V(on):V(off) ratio is 1.73. At an operating voltage of 3 volts, V(on) is 1.73 volts and V(off) is 1.00 volt.

At a multiplex of 1:16 and a bias of 1:5, the V(on):V(off) ratio is, for example, 1.29; at an operating voltage of 5 volts, V(on) is 1.58 volts and V(off) is 1.22 volts.

For a given display element with pre-specified drive, the dielectric is generally selected so that the initial voltage V(off) is just below or in the region of the "threshold voltage" (=voltage for 10% of the maximum contrast) for certain observation angle or for a certain observation angle range. The second voltage V(on) is then on the increase of the characteristic line above the threshold voltage.

In display elements which are intended to display various gray steps (for example video displays), it is necessary for the brightness to be varied as desired in the range from, for example, 10% of maximum brightness up to, for example, 90% of maximum brightness by switching the voltage.

In the case of multiplex drive (in particular also with gray steps) and TFT drive, when switching on and switching off or when switching from one gray step to another gray step, the voltage is switched from below or in the region of the threshold voltage to a second voltage above the threshold voltage in the region of the increase in the characteristic line.

In the case of "static drive", the switch-on times are generally relatively short since the switch-on voltage is very much greater than the saturation voltage.

In the case of multiplex drive and TFT drive, in contrast, the switch-on times, in particular, are usually relatively long.

There is thus still a great demand for liquid-crystalline phases having high clear points, low melting points and very short switch-on times when used in LC display elements in which the voltage is switched from below or approximately at the threshold voltage to a second voltage on the increase of the electrooptical characteristic line.

The invention has the object of providing LC display elements which have a broad operating temperature range and only have the abovementioned disadvantages to a lesser extent, or not at all.

It has now been found that LC display elements having particularly favorable electrooptical properties, in particular having extremely short switch-on times $T_{on}$ when the voltage is switched from a first voltage below or approximately at the threshold voltage to a second voltage on the increase of the electrooptical characteristic line, are obtained when the dielectric contains at least one component of the formula I $$R^1-A^1-Z^1-A-O-R^2$$

in which
- $R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one another, or one of the two groups $R^1$ and $R^2$ is alternatively H,
- $Z^1$ is —$CH_2$—O—, —$OCH_2$—, —$CH_2CH_2$— or a single bond,
- $A^1$ is trans-1,4-cyclohexylene in which, in addition, one or two nonadjacent $CH_2$ groups may be replaced by O and/or S, or 1,4-cyclohexenylene, and
- A is unsubstituted or fluorine-substituted 1,4-phenylene.

The invention thus relates to a LC display element containing a liquid-crystalline phase described above, in particular an electrooptical display element based on a TN cell having a particularly short switch-on time $T_{on}$ when the voltage is switched from a first voltage below or approximately at the threshold voltage to a second voltage on the increase of the electrooptical characteristic line, characterized in that the dielectric simultaneously contains at least one component of the formula I $$R^1-A^1-Z^1-A-O-R^2$$

in which
- $R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one another, or one of the two groups $R^1$ and $R^2$ is alternatively H,
- $Z^1$ is —$CH_2$—O—, —$OCH_2$—, —$CH_2CH_2$— or a single bond,
- $A^1$ is trans-1,4-cyclohexylene in which, in addition, one or two nonadjacent $CH_2$ groups may be replaced by O and/or S, or 1,4-cyclohexenylene, and is unsubstituted or fluorine-substituted 1,4-phenylene, and at least one component selected from the compounds of the formulae II and III $$R^3-A^2-Z^2-A^3-A'-R^4 \quad \text{II}$$

$$R^3-A^2-Z^2-A'-Z^3-A^3-R^4 \quad \text{III}$$

in which
- $R^3$ is H or alkyl having 1 to 9 C atoms, in which, in addition, one or two nonadjacent $CH_2$ groups may be replaced by —O—, —CO—, —O—CO—, —CO—O— and/or —CH=CH—,
- $R^4$ is H, alkyl having 1 to 9 C atoms in which, in addition, one or two nonadjacent $CH_2$ groups may be replaced by —O—, —CO—, —O—CO—, —CO—O— and/or —CH=CH—, halogen, CN, NCS or $N_3$,
- $Z^2$ and $Z^3$ are each —$CH_2CH_2$—, —$OCH_2$—, —$CH_2O$— —O—CO—, —CO—O—, or a single bond,
- $A^2$ and $A^3$ are each trans-1,4-cyclohexylene in which, in addition, one or two nonadjacent $CH_2$ groups may be replaced by O and/or S,
- A' is unsubstituted or fluorine-substituted 1,4-phenylene in which, in addition, one or two CH groups may be replaced by N.

The invention furthermore relates to an appropriate display element whose dielectric additionally contains at least one component of the formula IV $$R^3-A^2-Z^2-A^3-(Z^4-A^4)_m-Z^3-A'-(Z^5-A^5)_n-R^4 \quad \text{IV}$$

in which
- $Z^4$ and $Z^5$ are each —$CH_2CH_2$—, —$OCH_2$—, —$CH_2O$—, —O—CO—, —CO—O— or a single bond,
- $A^4$ and $A^5$ are each trans-1,4-cyclohexylene or unsubstituted or fluorine-substituted 1,4-phenylene in which, in addition, one or two CH groups may be replaced by N,
- m and n are each 0 or 1, and $R^3$, $R^4$, $A^2$, $A^3$, A, $Z^2$ and $Z^3$ have the meaning given in claim 4, and an appropriate electrooptical display element which is operated in the region of the first transmission minimum according to Gooch-Tarry.

The invention furthermore relates to the use of compounds of the formula I $$R^1-A^1-Z^1-A-O-R^2$$

in which
- $R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one another, or one of the two groups $R^1$ and $R^2$ is alternatively H,
- $Z^1$ is —$CH_2$—O—, —$OCH_2$—, —$CH_2CH_2$— or a single bond,
- $A^1$ is trans-1,4-cyclohexylene in which, in addition one or two nonadjacent $CH_2$ groups may be replaced by O and/or S, or 1,4-cyclohexenylene, and
- A is unsubstituted or fluorine-substituted 1,4-phenylene, as components of liquid-crystalline dielectrics containing at least three liquid-crystalline compounds, for shortening the switch-on time $T_{on}$ of electrooptical display elements based on a TN cell when the voltage is switched from a first voltage below or approximately at the threshold voltage to a second voltage on the increase of the electrooptical characteristic line, and to a process for shortening the switch-on time $T_{on}$ of electrooptical display elements based on a TN cell when the voltage is switched from a first voltage below or approximately at the threshold voltage to a second voltage on the increase of the electrooptical characteristic line, characterized in that the dielectric contains at least one component of the formula I $$R^1-A^1-Z^1-A-O-R^2$$

in which $R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one another, or one of the two groups $R^1$ and $R^2$ is alternatively H, $Z^1$ is —$CH_2$—O—, —O$CH_2$—, —$CH_2CH_2$— or a single bond, $A^1$ is trans-1,4-cyclohexylene in which, in addition one or two nonadjacent $CH_2$ groups may be replaced by O and/or S, or 1,4-cyclohexenylene, and A is unsubstituted or fluorine-substituted 1,4-phenylene.

The invention finally relates to a dielectric for use in an electrooptical display element based on a TN cell having a particularly short switch-on time $T_{on}$ when the voltage is switched from a first voltage below or approximately at the threshold voltage to a second voltage on the increase of the electrooptical characteristic line, characterized in that it simultaneously contains one component of the formula I

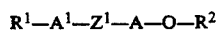

in which $R^1$ and $R^2$, independently of one another, are each alkyl having 1 to 9 C atoms, in which, in addition, one or two $CH_2$ groups may be replaced by —O—, —CO—, —O—CO—, —CO—O— and/or —CH=CH—, where two O atoms are not linked directly to one another, or one of the two groups $R^1$ and $R^2$ is alternatively H, $Z^1$ is —$CH_2$—O—, —O$CH_2$—, —$CH_2CH_2$— or a single bond, $A^1$ is trans-1,4-cyclohexylene in which, in addition one or two nonadjacent $CH_2$ groups may be replaced by O and/or S, or 1,4-cyclohexenylene, and A is unsubstituted or fluorine-substituted 1,4-phenylene, and at least one component selected from the compounds of the formulae II and III

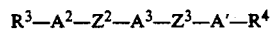

in which $R^3$ is H or alkyl having 1 to 9 C atoms, in which, in addition, one or two nonadjacent $CH_2$ groups may be replaced by —O—, —CO—, —O—CO—, —CO—O— and/or —CH=CH—, $R^4$ is H, alkyl having 1 to 9 C atoms in which, in addition, one or two nonadjacent $CH_2$ groups may be replaced by —O—, —CO—, —O—CO—, —CO—O— and/or —CH=CH—, halogen, CN, NCS or $N_3$, $Z^2$ and $Z^3$ are each —$CH_2CH_2$—, —O$CH_2$—, —$CH_2$O—, —O—CO—, —CO—O—, or a single bond, $A^2$ and $A^3$ are each trans-1,4-cyclohexylene in which, in addition, one or two nonadjacent $CH_2$ groups may be replaced by O and/or S, A' is unsubstituted or fluorine-substituted 1,4-phenylene in which, in addition, one or two CH groups may be replaced by N, and a corresponding dielectric containing at least one component of the formula IV

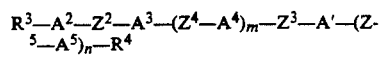

in which $Z^4$ and $Z^5$ are each —$CH_2CH_2$—, —O$CH_2$—, —$CH_2$O—, —O—CO—, —CO—O— or a single bond, $A^4$ and $A^5$ are each trans-1,4-cyclohexylene or unsubstituted or fluorine-substituted 1,4-phenylene in which, in addition, one or two CH groups may be replaced by N, m and n are each 0 or 1, and $R^3$, $R^4$, $A^2$, $A^3$, A, $Z^2$ and $Z^3$ have the meaning given in claim 4.

The dielectrics may also contain further additives known to those skilled in the art and described in the literature. For example, 0–15% of pleochroic dyes, furthermore conductive salts, for example ethyldimethyldodecylammonium 4-hexoxybenzoate, tetrabutylammonium tetraphenylborate or complex salts of crown ethers (compare, for example, Haller et al., Mol. Cryst. Liq. Cryst. Volume 24, pages 249–258, (1973)) for improving the conductivity, or substances for modifying the dielectric anisotropy, the viscosity and/or the orientation of the nematic phases can be added. Such substances are described, for example, in DE-OS 2,209,127, 2,240,864, 2,321,632, 2,338,281, 2,450,088, 2,637,430 and 2,853,728.

The individual components of the formula I, II, III and IV of the liquid-crystalline phases according to the invention are either known or can easily be derived from the prior art by the relevant person skilled in the art since they are based on standard processes described in the literature.

Corresponding compounds are described, for example, in German Patent Applications 2,636,684, 2,800,553, 2,933,563, 2,933,611, 2,948,836, 3,001,661, 3,102,017, 3,149,139, 3,206,269, 3,139,130, 3,223,637, 3,211,601, 3,317,597, 3,317,921, 3,339,218, 3,401,320, 3,410,734 and 3,545,345, in European Patent Applications 0,019,665, 0,058,512, 0,062,470, 0,084,194, 0,084,974, 0,090,671, 0,094,198, 0,099,099, 0,102,047, 0,119,756, 0,122,389, 0,129,177, 0,167,912 and 0,168,683, in the International Patent Application WO 85/04874, in Japanese Patent Applications 58-126,821-A, 58-177,989-A, 60-161,941-A, 60-161,957-A, 60-222,458-A and 60-239,470-A and in U.S. Pat. No. 4,439,015.

Surprisingly, it has been shown that the dielectrics according to the invention, in particular the combination of components of the formulae I and II and/or III, have significantly shorter switching times (in particular significantly shorter switch-on times) under the specific drive conditions mentioned (that is to say, for example, in TFT or high-multiplex displays) than other dielectrics without this specific substance combination, even if relevant physical properties and measurement conditions (rotational viscosity, elastic constants, the product $d \times \Delta n$ of the layer thickness and the optical anisotropy, and the drive voltage) are virtually identical.

The better switching (switch-on) times of the LC display elements according to the invention are caused not only by better viscosities or more suitable elastic constants. The reason is very probably above all the type of interactions between the LC molecules and the display surfaces. In particular, it can be assumed that the mixtures according to the invention have a greater tilt angle than other comparable mixtures and the switch-on time especially is therefore significantly shorter.

If other compounds which do not meet the criteria mentioned (for example molecules which contain exclusively cyclohexane rings) are added to dielectrics of this type, the switching times are impaired.

In the compounds of the formula I, $R^1$ and $R^2$ are, independently of one another, preferably alkyl in which, in addition, a $CH_2$ group (which is not linked directly to —O— or —$A^1$—) may be replaced by —O— or —CH=CH—. Straight-chain alkyl groups having 1 to 5 C atoms are particularly preferred. Compounds of the formula I in which $R^2$ is alkanoyl are furthermore preferred. $R^2$ is then preferably straight-chain alkanoyl having 2 to 5 C atoms. Z is preferably —$CH_2CH_2$— or a single bond. In particularly preferred compounds, Z is a single bond. $A^1$ is preferably trans-1,4-cyclohexylene. A is preferably 1,4-phenylene. Particularly preferred components of the formula I are those of the subformulae Ia, Ib, Ic and Id:

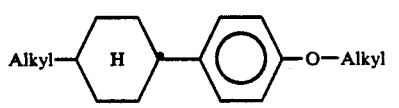
Ia

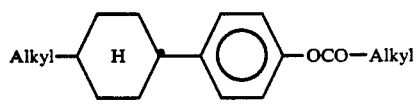
Ib

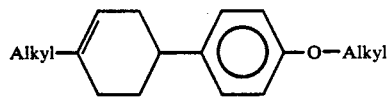
Ic

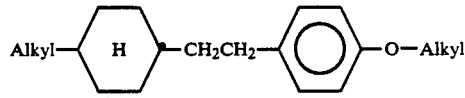
Id

Compounds of the subformula Ia are particularly preferred.

The dielectrics of the display elements according to the invention preferably contain 10 to 80%, in particular 20 to 70%, of the total content of compounds of the formula I. A further preferred total content of compounds of the formula I is 35 to 69%.

In the compounds of the formulae II and III, $A^2$ and $A^3$, independently of one another, are each preferably trans-1,4-cyclohexylene or trans-1,3-dioxane-2,5-diyl, particularly preferably trans-1,4-cyclohexylene. $R^3$ is preferably straight-chain alkyl, preferably having 2 to 7 C atoms, in which, in addition, one $CH_2$ group may be replaced by —O— or —CH=CH—. n-Alkyl is particularly preferred. $R^4$ is preferably straight-chain alkyl, preferably having 2 to 7 C atoms, in which, in addition, one $CH_2$ group may be replaced by —O— or —CH= CH—, or is halogen, CN, NCS or $N_3$. Particularly preferred meanings for $R^4$ are n-alkyl, n-alkoxy, F, CN and NCS. $Z^2$ and $Z^3$ are preferably each, independently of one another, —$CH_2CH_2$—, —CO—O—, —O—CO— or a single bond. At least one of the groups $Z^2$ and $Z^3$ is preferably a single bond.

A' is preferably 1,4-phenylene, 2- or 3-fluoro-1,4-phenylene, pyridine-2,5-diyl or pyrimidine-2,5-diyl. Particularly preferred meanings for A' are 1,4-phenylene and 2- or 3-fluoro-1,4-phenylene.

Particularly preferred components of the formula II are those of the subformulae IIa to IIv:

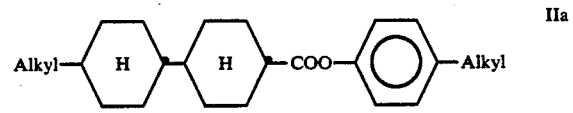
IIa

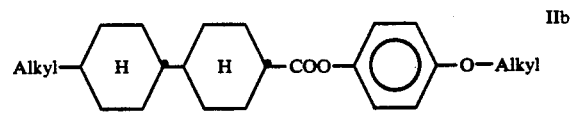
IIb

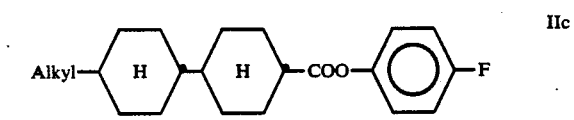
IIc

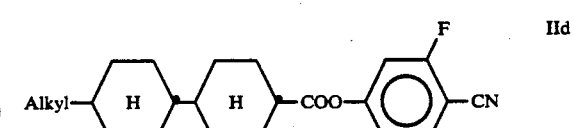
IId

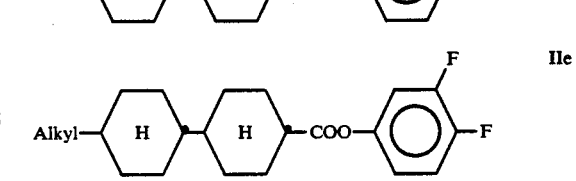
IIe

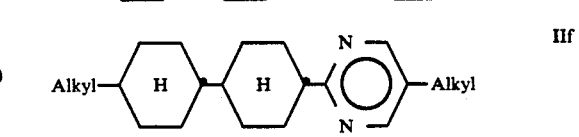
IIf

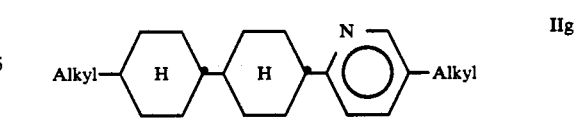
IIg

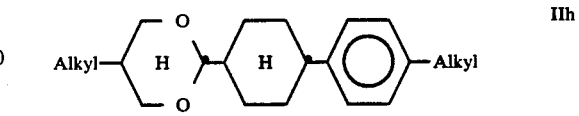
IIh

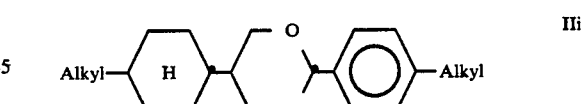
IIi

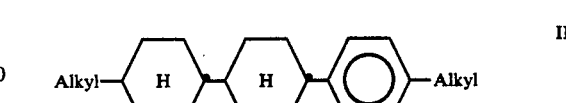
IIj

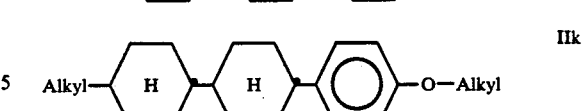
IIk

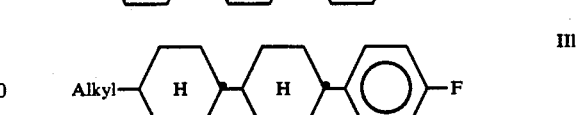
IIl

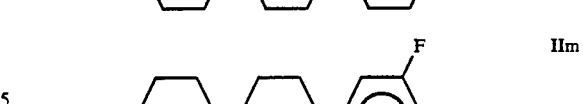
IIm

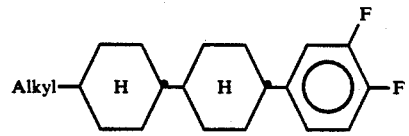 IIn

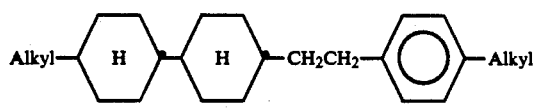 IIo

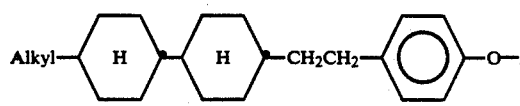 IIp

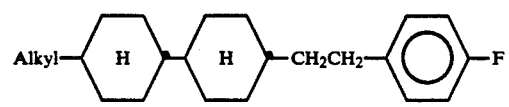 IIq

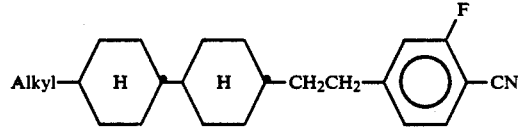 IIr

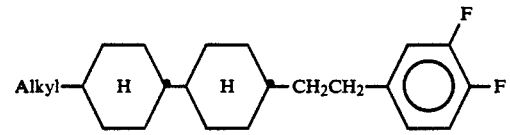 IIs

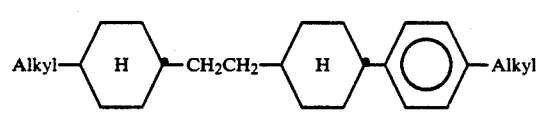 IIt

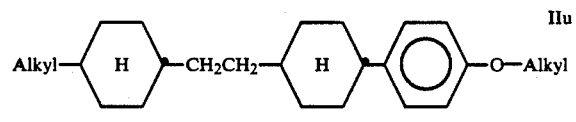 IIu

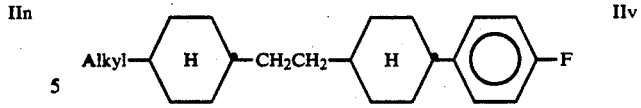 IIv

Of these, those of the subformula IIa, IIc, IIj, IIl, IIm, IIn, IIo, IIp, IIq, IIr and IIs are preferred. Those of the subformulae IIo and IIp are particularly preferred.

Particularly preferred components of the formula III are those of the subformulae IIIa, IIIb and IIIc:

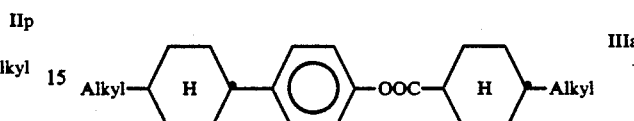 IIIa

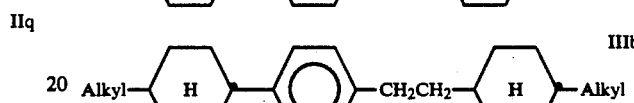 IIIb

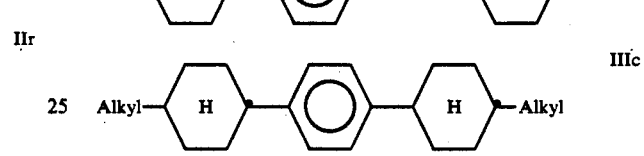 IIIc

Of these, those of the subformulae IIIa and IIIc, in particular IIIa, are preferred.

Besides components of the formula I, preferred dielectrics contain at least one component of the formula II.

The dielectrics preferably contain 5 to 50%, in particular 10 to 40%, of the total content of compounds of the formulae II and III. A further preferred total content is 20 to 35%.

In the compounds of the formula IV, $Z^4$ and $Z^5$ are each, independently of one another, preferably —CH$_2$CH$_2$—, —CO—O—, —O—CO— or a single bond. $A^4$ and $A^5$ are preferably trans-1,4-cyclohexylene or 1,4-phenylene. $R^3$, $R^4$, $A^2$, $A^3$, $A'$, $Z^2$ and $Z^3$ have the meanings indicated as preferred in the formulae II and III. (m+n) is preferably 1.

Particularly preferred compounds of the formula IV are those of the subformulae IVa to IVk:

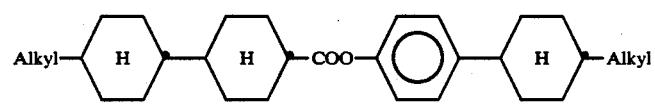 IVa

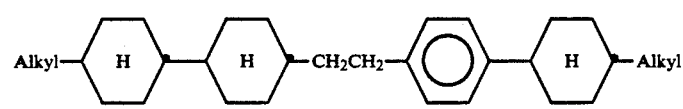 IVb

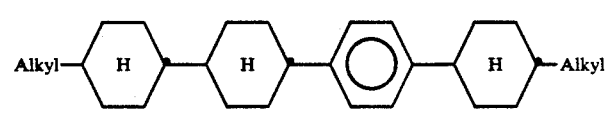 IVc

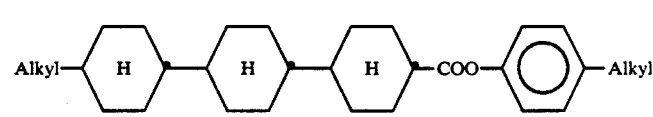 IVd

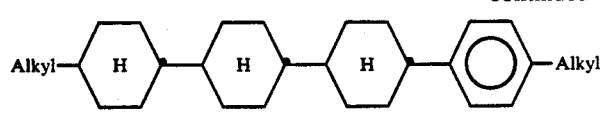
IVe

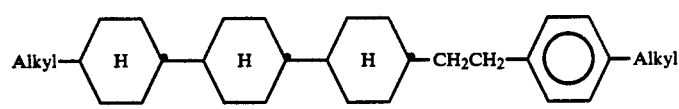
IVf

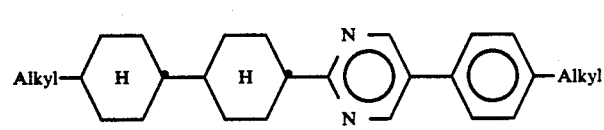
IVg

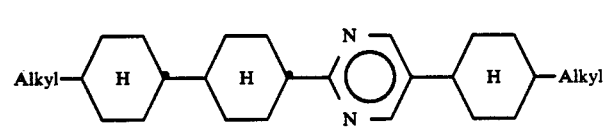
IVh

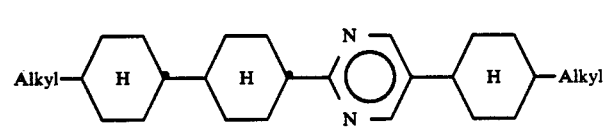
IVi

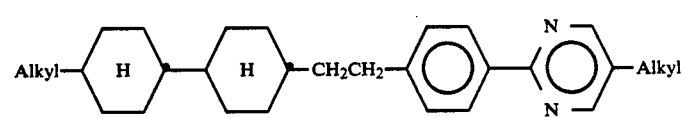
IVj

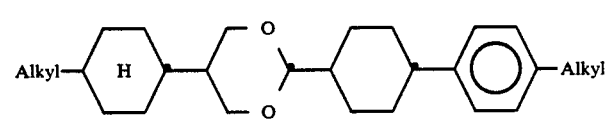

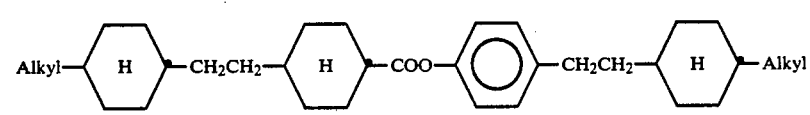
IVk

Of these, those of the subformulae IVa, IVb, IVg, IVh, IVj and IVK (sic), in particular those of the subformula IVa, are particularly preferred.

The dielectrics preferably contain 0 to 40%, in particular 5 to 30%, of the total content of compounds of the formula IV.

The content in the dielectrics of compounds which are decidedly positive dielectrically is advantageously 10 to 50%, particularly preferably 20 to 40%. In principle, any customary dielectrically positive components can be employed. The choice of the most highly suitable compounds depends, above all, on the threshold voltage and optical anisotropy desired. Dielectrically positive compounds of the formulae II, III and/or IV can be chosen and/or other customary compounds, for example those of the formulae Va to Ve below:

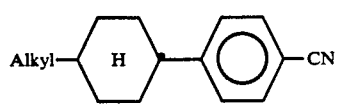
Va

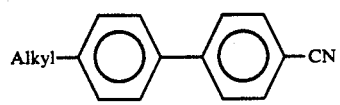
Vb

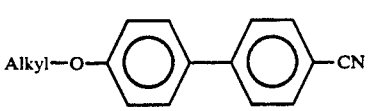
Vc

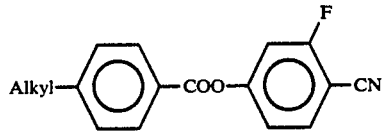
Vd

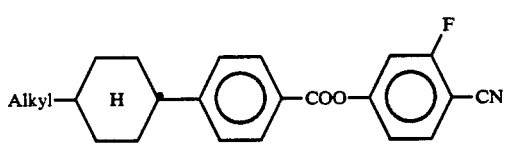
Ve

The examples below are intended to illustrate the invention without representing a limitation.

The symbols have the following meanings:

| | |
|---|---|
| S-N | smectic-nematic phase transition temperature, in degrees Celsius, |
| c.p. | clear point, in degrees Celsius, |
| visc. | viscosity at 20° (mPa · s), |
| thresh. | threshold voltage of a TN cell at 20°, observation angle 0° (vertical) and a contrast of 10%. |
| $T_{on}$, $T_{off}$ | switch-on or switch-off time in msec. |
| $K_3/K_1$ | ratio between the elastic constants of bending and stretching |
| n | birefringence |

Above and below all temperatures are given in °C. The percentages are by weight.

Procedure for measuring the switching time:

If the switching times of liquid crystals in displays are to be measured, the voltage, in the case of so-called static drive, is switched from 0 volt to a voltage which is, for example, approximately twice to 3 times the threshold voltage. If the threshold is, for example, 2.0 volts, the switching time can be measured on switching from 0 volts to 4-6 volts and back. Under these conditions, the switch-on times are usually somewhat shorter than the switch-off times.

In the case of multiplex drive, however, the voltage is switched from a first voltage below or approximately at the threshold to a second voltage on the increase of the characteristic line. This applies, in particular, in the case of relatively high multiplex ratios and in TFT displays. Under these conditions, the switch-on times, in particular, are very long.

In order to simulate these conditions, the voltage in our measurements is switched from a fixed initial voltage of exactly 1.00 volt to a voltage at which 40% of the maximum contrast is achieved (when observed vertically).

The investigations were carried out on mixtures for the "first minimum" according to Gooch and Tarry. The product of the layer thickness and the birefringence was therefore in the region of about 0.5.

EXAMPLE 1

A mixture comprising

| | |
|---|---|
| 28% | trans-1-p-methoxyphenyl-4-propylcyclohexane, |
| 23% | trans-1-p-ethoxyphenyl-4-propylcyclohexane, |
| 18% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propylcyclohexyl)-biphenyl, |
| 7% | trans,trans-4-(2-p-cyanophenyl-ethyl)-4'-ethyl-bicyclohexyl, |
| 7% | trans,trans-4-(2-p-cyanophenyl-ethyl)-4'-propyl-bicyclohexyl, |
| and | |
| 6% | trans,trans-4-(2-p-cyanophenyl-ethyl)-4'-pentyl-bicyclohexyl, | exhibits c.p. 76.3°, $\Delta n$ 0.1004, thresh. 2.6 V, $T_{on}$ 120 msec and $T_{off}$ 15 msec.

EXAMPLE 2

A mixture comprising

| | |
|---|---|
| 20% | p-trans-4-propylcyclohexyl-benzonitrile, |
| 22% | trans-1-p-methoxyphenyl-4-propylcyclohexane, |
| 16% | trans-1-p-ethoxyphenyl-4-propylcyclohexane, |
| 11% | trans-1-p-butoxyphenyl-4-propylcyclohexane, |
| 10% | trans,trans-4-(2-p-fluorophenyl-ethyl)-4'-pentyl-bicyclohexyl, |
| 10% | trans,trans-4-(2-p-propylphenyl-ethyl)-4'-propyl-bicyclohexyl, |
| 3% | 4,4'-bis-(trans-4-propylcyclohexyl)-biphenyl, |
| 2% | 4,4'-bis-(trans-4-pentylcyclohexyl)-biphenyl |
| and | |
| 6% | 4-(trans-4-pentylcyclohexyl)-4'-(trans-4-propylcyclohexyl)-biphenyl | exhibits c.p. 71°, $\Delta n$ 0.1017, thresh. 2.1 V, $T_{on}$ 86 msec and $T_{off}$ 15 msec.

EXAMPLE 3

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 10% | p-propylphenyl trans,trans-4-propyl-bicyclohexyl-4'-carboxylate, |
| 10% | p-pentylphenyl trans,trans-4-propyl-bicyclohexyl-4'-carboxylate, |
| 3% | 4,4'-bis-(trans-4-propylcyclohexyl)-biphenyl, |
| 2% | 4,4'-bis-(trans-4-pentylcyclohexyl)-biphenyl |
| and | |
| 6% | 4-(trans-4-pentylcyclohexyl)-4'-(trans-4-propylcyclohexyl)-biphenyl | exhibits c.p. 79.5°, $\Delta n$ 0.1029, thresh. 2.13 V, $T_{on}$ 98 msec, $T_{off}$ 14 msec.

EXAMPLE 4

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 10% | p-trans-4-propylcyclohexylphenyl trans-4-butyl-cyclohexanecarboxylate, |
| 10% | p-trans-4-propylcyclohexylphenyl trans-4-pentyl-cyclohexanecarboxylate, |
| 3% | 4,4'-bis-(trans-4-propylcyclohexyl)-biphenyl, |
| 2% | 4,4'-bis-(trans-4-pentylcyclohexyl)-biphenyl |
| and | |
| 6% | 4-(trans-4-pentylcyclohexyl)-4'-(trans-4-propylcyclohexyl)-biphenyl | exhibits c.p. 80.3°, $\Delta n$ 0.1003, thresh. 2.2 V, $T_{on}$ 127 msec and $T_{off}$ 16 msec.

EXAMPLE 5

A mixture comprising

| | |
|---|---|
| 20% | p-trans-4-propylcyclohexyl-benzonitrile, |
| 22% | trans-1-p-methoxyphenyl-4-propylcyclohexane, |
| 16% | trans-1-p-ethoxyphenyl-4-propylcyclohexane, |
| 11% | trans-1-p-butyxophenyl-4-propylcyclohexane, |
| 10% | trans,trans-4-(2-p-propylphenyl-ethyl)-4'-propyl-bicyclohexyl, |
| 10% | trans,trans-4-(2-p-propylphenyl-ethyl)-4'-pentyl-bicyclohexyl, |
| 3% | 4,4'-bis-(trans-4-propylcyclohexyl)-biphenyl, |
| 2% | 4,4'-bis-(trans-4-pentylcyclohexyl)-biphenyl |
| and | |
| 6% | 4-(trans-4-pentylcyclohexyl)-4'-(trans-4-propylcyclohexyl)-biphenyl | exhibits c.p. 71.8°, $\Delta n$ 0.1030, thresh. 2.16 V, $T_{on}$ 107 msec and $T_{off}$ 16 msec.

EXAMPLE 6

A mixture comprising

| | |
|---|---|
| 20% | p-trans-4-propylcyclohexyl-benzonitrile, |
| 22% | trans-1-p-methoxyphenyl-4-propylcyclohexane, |
| 16% | trans-1-p-ethoxyphenyl-4-propylcyclohexane, |
| 11% | trans-1-p-butoxyphenyl-4-propylcyclohexane, |
| 20% | trans,trans-4-(2-p-fluorophenyl-ethyl)-4'-pentyl-bicyclohexyl, |
| 3% | 4,4'-bis-(trans-4-propylcyclohexyl)-bisphenyl, |
| 2% | 4,4'-bis-(trans-4-pentylcyclohexyl)-biphenyl |
| and | |
| 6% | 4-(trans-4-pentylcyclohexyl)-4'-(trans-4-propylcyclohexyl)-biphenyl | exhibits c.p. 72.0°, Δn 0.1000, thresh. 2.13 V, $T_{on}$ 126 msec and $T_{off}$ 19 msec.

EXAMPLE 7

A mixture comprising

| | |
|---|---|
| 12% | p-trans-4-propylcyclohexyl-benzonitrile, |
| 8% | p-trans-4-butylcyclohexyl-benzonitrile, |
| 15% | trans-1-p-ethoxyphenyl-4-propylcyclohexane, |
| 13% | trans-1-p-butoxyphenyl-4-butylcyclohexane, |
| 8% | trans-1-p-ethoxyphenyl-4-butylcyclohexane, |
| 9% | trans-1-p-methoxyphenyl-4-pentylcyclohexane, |
| 5% | trans-1-p-ethoxyphenyl-4-pentylcyclohexane, |
| 5% | p-propylphenyl trans,trans-4-propyl-bicyclohexyl-4'-carboxylate, |
| 5% | p-pentylphenyl trans,trans-4-propyl-bicyclohexyl-4'-carboxylate, |
| 5% | p-propylphenyl trans,trans-4-butyl-bicyclohexyl-4'-carboxylate, |
| 5% | p-pentylphenyl trans,trans-4-butyl-bicyclohexyl-4'-carboxylate, |
| 3% | 4,4'-bis-(trans-4-propylcyclohexyl)-biphenyl, |
| 2% and | 4,4'-bis-trans-4-pentylcyclohexyl)-biphenyl |
| 5% | 4-(trans-4-pentylcyclohexyl)-4'-(trans-4-propyl-cyclohexyl)-biphenyl | exhibits c.p. 81°, Δn 0.1007, thresh. 2.3 V, $T_{on}$ 108 msec. and $T_{off}$ 16 msec.

EXAMPLE 8

A mixture comprising

| | |
|---|---|
| 15% | p-trans-4-propylcyclohexyl-benzonitrile, |
| 10% | p-trans-4-butylcyclohexyl-benzonitrile, |
| 15% | trans-1-p-methoxyphenyl-4-propylcyclohexane, |
| 15% | trans-1-p-ethoxyphenyl-4-propylcyclohexane, |
| 10% | trans-1-p-butoxyphenyl-4-propylcyclohexane, |
| 20% | trans,trans-4-(2-p-propylphenyl-ethyl)-4'-propyl-bicyclohexyl |
| and | |
| 15% | trans,trans-4-(2-p-propylphenyl-ethyl)-4'-pentyl-bicyclohexyl | exhibits c.p. 64.8°, Δn 0.0940, thresh. 1.95 V, $T_{on}$ 119 msec and $T_{off}$ msec.

EXAMPLE 9

A mixture comprising

| | |
|---|---|
| 20% | p-trans-4-propylcyclohexyl-benzonitrile, |
| 15% | trans-1-p-methoxy-4-propylcyclohexane, |
| 10% | trans-1-p-ethoxyphenyl-4-propylcyclohexane, |
| 10% | trans-1-p-butoxyphenyl-4-propylcyclohexane, |
| 14% | trans,trans-4-propoxy-4'-propyl-bicyclohexane, |
| 10% | p-propylphenyl trans,trans-4-propyl-bicyclohexyl-4'-carboxylate, |
| 10% | p-pentylphenyl trans,trans-4-propyl-bicyclohexyl-4'-carboxylate, |
| 3% | 4,4'-bis-(trans-4-propylcyclohexyl)-biphenyl, |
| 2% and | 4,4'-bis-(trans-4-pentylcyclohexyl)-biphenyl |
| 6% | 4-(trans-4-pentylcyclohexyl)-4'-)trans-4-propyl-cyclohexyl)-biphenyl | exhibits c.p. 81.7°, Δn 0.0975, thresh. 2.15 V, $T_{on}$ 122 msec and $T_{off}$ 18 msec.

EXAMPLE 10

A mixture comprising

| | |
|---|---|
| 15% | p-trans-4-propylcyclohexyl-benzonitrile, |
| 5% | 4-ethyl-4'-cyanobiphenyl, |
| 5% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 13% | trans-1-p-methoxyphenyl-4-propylcyclohexane, |
| 10% | trans-1-p-ethoxyphenyl-4-propylcyclohexane, |
| 10% | trans-1-p-butoxyphenyl-4-propylcyclohexane, |
| 5% | 4,4'-bis-(trans-4-propylcyclohexyl)-biphenyl, |
| 5% | 4,4'-bis-(trans-4-propylcyclohexyl)-2-fluorobiphenyl, |
| 5% | 4,4'-bis-(trans-4-pentylcyclohexyl)-biphenyl, |
| 5% | 4,4'-bis-(trans-4-pentylcyclohexyl)-2-fluorobiphenyl, |
| 5% | 4-(trans-4-pentylcyclohexyl)-4'-(trans-4-propyl-cyclohexyl)-biphenyl and |
| 5% | 4-(trans-4-pentylcyclohexyl)-4'-(trans-4-propyl-cyclohexyl)-2-fluorobiphenyl | exhibits c.p. 88°, Δn 0.1378 and favorable switching times.

EXAMPLE 11

A mixture comprising

| | |
|---|---|
| 17% | p-trans-4-propylcyclohexyl-benzonitrile, |
| 4% | 4-ethyl-4'-cyanobiphenyl, |
| 4% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 13% | trans-1-p-methoxyphenyl-4-propylcyclohexane, |
| 10% | trans-1-p-ethoxyphenyl-4-propylcyclohexane, |
| 9% | trans-1-p-butoxyphenyl-4-propylcyclohexane, |
| 5% | 4,4'-bis-(trans-4-propylcyclohexyl)-biphenyl, |
| 5% | 4,4'-bis-(trans-4-propylcyclohexyl)-2-fluorobiphenyl, |
| 5% | 4,4'-bis-(trans-4-pentylcyclohexyl)-biphenyl, |
| 5% | 4,4'-bis-(trans-4-pentylcyclohexyl)-2-fluorobiphenyl, |
| 6% | 4-(trans-4-pentylcyclohexyl)-4'-(trans-4-propyl-cyclohexyl)-biphenyl and |
| 5% | 4-(trans-4-pentylcyclohexyl)-4'-(trans-4-propyl-cyclohexyl)-2-fluorobiphenyl | exhibits c.p. 91°, Δn 0.1393, thresh. 1.9 V and favorable switching times.

EXAMPLE 12

A mixture comprising

| | |
|---|---|
| 4% | 3-fluoro-4-cyanophenyl p-ethylbenzoate, |
| 5% | 3-fluoro-4-cyanophenyl p-propylbenzoate, |
| 5% | 3-fluoro-4-cyanophenyl p-pentylbenzoate, |
| 4% | 3-fluoro-4-cyanophenyl p-(trans-4-propylcyclohexyl)-benzoate, |
| 4% | 3-fluoro-4-cyanophenyl p-(trans-4-pentylcyclohexyl)-benzoate, |
| 16% | trans-1-p-methoxyphenyl-4-propylcyclohexane, |
| 15% | trans-1-p-ethoxyphenyl-4-propylcyclohexane, |
| 15% | trans-1-p-butoxyphenyl-4-propylcyclohexane, |
| 12% | 4-ethyl-4'-(trans-4-propylcyclohexyl)-biphenyl, |
| 5% | 4,4'-bis-(trans-4-propylcyclohexyl)-biphenyl, |
| 5% | 4,4'-bis-(trans-4-propylcyclohexyl)-2-fluorobiphenyl, |
| 5% | 4-(trans-4-pentylcyclohexyl)-4'-(trans-4-propyl-cyclohexyl)-biphenyl and |
| 5% | 4-(trans-4-pentylcyclohexyl)-4'-(trans-4-propyl-cyclohexyl)-2-fluorobiphenyl | exhibits c.p. 96°, Δn 0.1317, thresh. 1.9 V and favorable switching times.

EXAMPLE 13

A mixture comprising

| | |
|---|---|
| 5% | 3-fluoro-4-cyanophenyl p-ethylbenzoate, |
| 5% | 3-fluoro-4-cyanophenyl p-propylbenzoate, |
| 5% | 3-fluoro-4-cyanophenyl p-pentylbenzoate, |
| 4% | 3-fluoro-4-cyanophenyl p-(trans-4-propylcyclohexyl)-benzoate, |
| 4% | 3-fluoro-4-cyanophenyl p-(trans-4-pentylcyclohexyl)-benzoate, |
| 17% | trans-1-p-methoxyphenyl-4-propylcyclohexane, |
| 15% | trans-1-p-ethoxyphenyl-4-propylcyclohexane, |
| 15% | trans-1-p-butoxyphenyl-4-propylcyclohexane, |
| 11% | 4-ethyl-4'-(trans-4-propylcyclohexyl)-biphenyl, |
| 4% | 4,4'-bis-(trans-4-propylcyclohexyl)-biphenyl, |
| 5% | 4,4'-bis-(trans-4-propylcyclohexyl)-2-fluorobiphenyl, |
| 5% | 4-(trans-4-pentylcyclohexyl)-4'-(trans-4-propylcyclohexyl)-biphenyl and |
| 5% | 4-(trans-4-pentylcyclohexyl)-4'-(trans-4-propylcyclohexyl)-2-fluorobiphenyl | exhibits c.p. 91°, Δn 0.1317, thresh. 1.8 V and favorable switching times.

EXAMPLE 14

A mixture comprising

| | |
|---|---|
| 9% | p-trans-4-propylcyclohexyl-benzonitrile, |
| 9% | 4-ethyl-4'-cyanobiphenyl, |
| 7% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 16% | trans-1-p-methoxyphenyl-4-propylcyclohexane, |
| 4% | p-propylphenyl trans-4-(trans-4-propylcyclohexyl)-cyclohexanecarboxylate, |
| 4% | p-pentylphenyl trans-4-(trans-4-propylcyclohexyl)-cyclohexane-carboxylate, |
| 4% | p-propylphenyl trans-4-(trans-4-butylcyclohexyl)-cyclohexanecarboxylate, |
| 4% | p-pentylphenyl trans-4-(trans-4-butylcyclohexyl)-cyclohexanecarboxylate, |
| 5% | 1-[trans-4-(trans-4-pentylcyclohexyl-cyclohexyl]-2-(p-propylphenyl)-ethane, |
| 11% | p-trans-4-propylcyclohexylphenyl trans-4-butyl-cyclohexanecarboxylate and |
| 10% | p-trans-4-propylcyclohexylphenyl trans-4-pentyl-cyclohexanecarboxylate | exhibits c.p. 90° and favorable switching times.

EXAMPLE 15

A mixture comprising

| | |
|---|---|
| 9% | p-trans-4-propylcyclohexyl-benzonitrile, |
| 9% | 4-ethyl-4'-cyanobiphenyl, |
| 7% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 16% | trans-1-p-methoxyphenyl-4-propylcyclohexane, |
| 3% | p-propylphenyl trans-4-(trans-4-propylcyclohexyl)-cyclohexanecarboxylate, |
| 3% | p-pentylphenyl trans-4-(trans-4-propylcyclohexyl)-cyclohexanecarboxylate, |
| 3% | p-propylphenyl trans-4-(trans-4-butylcyclohexyl)-cyclohexanecarboxylate, |
| 3% | p-pentylphenyl trans-4-(trans-4-butylcyclohexyl)-cyclohexanecarboxylate, |
| 6% | 1-[trans-4-(trans-4-propylcyclohexyl)-cyclohexyl]-2-(p-propylphenyl)-ethane |
| 5% | 1-[trans-4-(trans-4-)pentylcyclohexyl)-cyclohexyl]-2-(p-propylphenyl)-ethane, |
| 12% | p-trans-4-propylcyclohexylphenyl trans-4-butyl-cyclohexanecarboxylate and |
| 12% | p-trans-4-propylcyclohexylphenyl trans-4-pentyl-cyclohexanecarboxylate | exhibits c.p. 91° and favorable switching times.

EXAMPLE 16

A mixture comprising

| | |
|---|---|
| 4% | 3-fluoro-4-cyanophenyl p-(trans-4-propylcyclohexyl)-benzoate, |
| 4% | 3-fluoro-4-cyanophenyl p-(trans-4-pentylcyclohexyl)-benzoate, |
| 14% | trans-1-p-propylphenyl-4-pentylcyclohexane, |
| 5% | 3-fluoro-4-cyanophenyl p-propylbenzoate, |
| 5% | 3-fluoro-4-cyanophenyl p-pentylbenzoate, |
| 5% | 3-fluoro-4-cyanophenyl p-ethylbenzoate, |
| 18% | trans-1-p-methoxyphenyl-4-propylcyclohexane, |
| 5% | p-propylphenyl trans-4-(trans-4-propylcyclohexyl)-cyclohexanecarboxylate, |
| 5% | p-pentylphenyl trans-4-(trans-4-propylcyclohexyl)-cyclohexanecarboxylate, |
| 5% | p-propylphenyl trans-4-(trans-4-butylcyclohexyl)-cyclohexanecarboxylate, |
| 5% | p-pentylphenyl trans-4-(trans-4-butylcyclohexyl)-cyclohexanecarboxylate, |
| 5% | 1-[trans-4-(trans-4-propylcyclohexyl)-cyclohexyl]-2-(p-propylphenyl)-ethane, |
| 5% | 1-[trans-4-(trans-4-pentylcyclohexyl)-cyclohexyl]-2-(p-propylphenyl)-ethane, |
| 8% | p-trans-4-propylcyclohexylphenyl trans-4-butyl-cyclohexanecarboxylate, and |
| 7% | p-trans-4-propylcyclohexylphenyl trans-4-pentyl-cyclohexanecarboxylate | exhibits c.p. 93° and favorable switching times.

EXAMPLE 17

A mixture comprising

| | |
|---|---|
| 11% | p-trans-4-propylcyclohexyl-benzonitrile, |
| 8% | 4-ethyl-4'-cyanobiphenyl, |
| 6% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 16% | trans-1-p-methoxyphenyl-4-propylcyclohexane, |
| 5% | p-propylphenyl trans-4-(trans-4-propylcyclohexyl)-cyclohexanecarboxylate, |
| 5% | p-pentylphenyl trans-4-(trans-4-propylcyclohexyl)-cyclohexanecarboxylate, |
| 5% | p-propylphenyl trans-4-(trans-4-butylcyclohexyl)-cyclohexanecarboxylate, |
| 5% | p-pentylphenyl trans-4-(trans-4-butylcyclohexyl)-cyclohexanecarboxylate, |
| 5% | 1-[trans-4-(trans-4-propylcyclohexyl)-cyclohexyl]-2-(p-propylphenyl)-ethane, |
| 5% | 1-[trans-4-(trans-4-pentylcyclohexyl)-cyclohexyl]-2-(p-propylphenyl)-ethane, |
| 9% | p-trans-4-propylcyclohexylphenyl trans-4-butyl-cyclohexanecarboxylate, and |
| 8% | p-trans-4-propylcyclohexylphenyl trans-4-pentyl-cyclohexanecarboxylate | exhibits c.p. 91° and favorable switching times.

EXAMPLE 18

A mixture comprising

| | |
|---|---|
| 12% | p-trans-4-propylcyclohexyl-benzonitrile, |
| 8% | p-trans-4-butylcyclohexyl-benzonitrile, |
| 7% | 4-ethyl-4'-cyanobiphenyl, |
| 7% | trans-1-p-butoxyphenyl-4-propylcyclohexane, |
| 7% | trans-1-p-ethoxyphenyl-4-butylcyclohexane, |
| 7% | trans-1-p-methoxyphenyl-4-pentylcyclohexane, |
| 10% | trans-1-p-ethoxyphenyl-4-propylcyclohexane, |
| 5% | p-propylphenyl trans-4-(trans-4-propylcyclohexyl)-cyclohexanecarboxylate, |
| 5% | p-pentylphenyl trans-4-(trans-4-propylcyclohexyl)-cyclohexanecarboxylate, |

-continued

| | |
|---|---|
| 5% | p-propylphenyl trans-4-(trans-4-butylcyclohexyl)-cyclohexanecarboxylate, |
| 5% | p-pentylphenyl trans-4-(trans-4-butylcyclohexyl)-cyclohexanecarboxylate, |
| 5% | 1-[trans-4-(trans-4-propylcyclohexyl)-cyclohexyl]-2-(p-propylphenyl)-ethane, |
| 4% | 1-[trans-4-(trans-4-pentylcyclohexyl)-cyclohexyl]-2-(p-propylphenyl)-ethane, |
| 4% | p-trans-4-propylcyclohexylphenyl trans-4-butyl-cyclohexanecarboxylate, |
| 4% | p-trans-4-propylcyclohexylphenyl trans-4-pentyl-cyclohexanecarboxylate and |
| 5% | 4-(trans-4-pentylcyclohexyl)-4'-(trans-4-propyl-cyclohexyl)-biphenyl | exhibits c.p. 90° and favorable switching times.

EXAMPLE 19

A mixture comprising

| | |
|---|---|
| 11% | p-trans-4-propylcyclohexyl-benzonitrile, |
| 9% | 4-ethyl-4'-cyanobiphenyl, |
| 6% | 4-propyl-4'-cyanobiphenyl, |
| 6% | 4-butyl-4'-cyanobiphenyl, |
| 13% | trans-1-p-ethoxyphenyl-4-propylcyclohexane, |
| 10% | trans-1-p-butoxyphenyl-4-propylcyclohexane, |
| 5% | p-propylphenyl trans-4-(trans-4-propylcyclo-hexyl)-cyclohexanecarboxylate, |
| 5% | p-pentylphenyl trans-4-(trans-4-propylcyclohexyl)-cyclohexanecarboxylate, |
| 5% | p-propylphenyl trans-4-(trans-4-butylcyclohexyl)-cyclohexanecarboxylate, |
| 5% | p-pentylphenyl trans-4-(trans-4-butylcyclohexyl)-cyhclohexanecarboxylate, |
| 4% | 1-[trans-4-(trans-4-propylcyclohexyl)-cyclohexyl]-2-(p-propylphenyl)ethane, |
| 4% | 1-[trans-4-(trans-4-pentylcyclohexyl)-cyclohexyl]-2-(p-propylphenyl)-ethane, |
| 6% | p-trans-4-propylcyclohexylphenyl trans-4-butyl-cyclohexanecarboxylate, |
| 6% | p-trans-4-propylcyclohexylphenyl trans-4-pentyl-cyclohexanecarboxylate and |
| 5% | 4-trans-4-pentylcyclohexyl)-4'-(trans-4-propyl-cyclohexyl)-biphenyl | exhibits c.p. 95° and favorable switching times.

EXAMPLE 20

A mixture comprising

| | |
|---|---|
| 9% | p-trans-4-propylcyclohexyl-benzonitrile, |
| 9% | 4-ethyl-4'-cyanobiphenyl, |
| 7% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 16% | trans-1-p-ethoxyphenyl-4-propylcyclohexane, |
| 5% | p-propylphenyl trans-4-(trans-4-propylcyclohexyl)-cyclohexanecarboxylate, |
| 5% | p-pentylphenyl trans-4-(trans-4-propylcyclohexyl)-cyclohexanecarboxylate, |
| 5% | p-propylphenyl trans-4-(trans-4-butylcyclohexyl)-cyclohexanecarboxylate, |
| 5% | p-pentylphenyl trans-4-(trans-4-butylcyclohexyl)-cyclohexanecarboxylate, |
| 5% | 1-[trans-4-(trans-4-propylcyclohexyl)-cyclohexyl]-2-(p-propylphenyl)-ethane, |
| 5% | 1-[trans-4-(trans-4-pentylcyclohexyl)-cyclohexyl]-2-(p-propylphenyl)-ethane, |
| 9% | p-trans-4-propylcyclohexylphenyl trans-4-butyl-cyclohexanecarboxylate and |
| 8% | p-trans-4-propylcyclohexylphenyl trans-4-pentyl-cyclohexanecarboxylate | exhibits c.p. 94° and favorable switching times.

EXAMPLE 21

A mixture comprising

| | |
|---|---|
| 9% | p-trans-4-propylcyclohexyl-benzonitrile, |
| 9% | 4-ethyl-4'-cyanobiphenyl, |
| 7% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 16% | trans-1-p-methoxyphenyl-4-propylcyclohexane, |
| 5% | p-propylphenyl trans-4-(trans-4-propylcyclohexyl)-cyclohexanecarboxylate, |
| 5% | p-pentylphenyl trans-4-(trans-4-propylcyclohexyl)-cyclohexanecarboxylate, |
| 5% | p-propylphenyl trans-4-(trans-4-butylcyclohexyl)-cyclohexanecarboxylate, |
| 5% | p-pentylphenyl trans-4-(trans-4-butylcyclohexyl)-cyclohexanecarboxylate, |
| 5% | 1-[trans-4-(trans-4-propylcyclohexyl)-cyclohexyl]-2-(p-propylphenyl)-ethane, |
| 5% | 1-[trans-4-(trans-4-pentylcyclohexyl)-cyclohexyl]-2-(p-propylphenyl)-ethane, |
| 9% | p-trans-4-propylcyclohexylphenyl trans-4-butyl-cyclohexanecarboxylate and |
| 8% | p-trans-4-propylcyclohexylphenyl trans-4-pentyl-cyclohexanecarboxylate | exhibits c.p. 90° and favorable switching times.

EXAMPLE 22

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-trans-4-pentylcyclohexyl)-4'-(trans-4-propyl-cyclohexyl)-biphenyl, |
| 10% | p-fluorophenyl trans,trans-4-propylcyclohexyl-cyclohexane-4'-carboxylate and |
| 10% | p-fluorophenyl trans,trans-4-pentylcyclohexyl-cyclohexane-4'-carboxylate | exhibits c.p. 77°; $\Delta n$ 0.1020; thresh. 1.83 V; $T_{on}$ 104 msec and $T_{off}$ 18 msec.

EXAMPLE 23

A mixture comprising

| | |
|---|---|
| 20% | p-trans-4-propylcyclohexyl-benzonitrile, |
| 22% | trans-1-p-methoxyphenyl-4-propylcyclohexane, |
| 16% | trans-1-p-ethoxyphenyl-4-propylcyclohexane, |
| 11% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl, |
| 10% | trans,trans-4-pentyl-4'-(5-propylpyridimin-2-yl)-cyclohexylcyclohexane and |
| 10% | trans,trans-4-butyl-4'-(5-propylpyridimin-2-yl)-cyclohexylcyclohexane | exhibits c.p. 73°; $\Delta n$ 0.1025; thresh. 2.24 V; $T_{on}$ 35 msec and $T_{off}$ 23 msec.

EXAMPLE 24

A mixture comprising

| | |
|---|---|
| 20% | p-trans-4-propylcyclohexyl-benzonitrile, |
| 20% | trans-1-p-methoxyphenyl-4-propylcyclohexane, |

-continued

| | |
|---|---|
| 15% | trans-1-p-ethoxyphenyl-4-propylcylohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl and |
| 20% | trans,trans,-4-butyl-4'-(5-heptylpyridimin-2-yl)-cyclohexylcyclohexane | exhibits c.p. 70°; $\Delta n$ 0.1000; thresh. 2.10 V; $T_{on}$ 158 msec and $T_{off}$ 17 msec.

EXAMPLE 25

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl and |
| 20% | trans-5-pentyl-2-[trans-4-(p-pentylphenyl)-cyclohexyl-1,3-dioxane | exhibits c.p. 65°; $\Delta n$ 0.1001; thresh. 1.88 V; $T_{on}$ 113 msec and $T_{off}$ 22 msec.

EXAMPLE 26

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl, |
| 10% | [p-(trans-4-propyl-cyclohexyl)-ethyl]-phenyl trans-4-[trans-(4-pentylcyclohexyl)-ethyl]-cyclo-hexanecarboxylate and |
| 10% | [p-(trans-4-pentyl-cyclohexyl)-ethyl]-phenyl trans-4-[trans-(4-pentylcyclohexyl)-ethyl]-cyclo-hexanecarboxylate | exhibits c.p. 88°; $\Delta n$ 0.1054; thresh. 2.28 V; $T_{on}$ 133 msec and $T_{off}$ 21 msec.

EXAMPLE 27

A mixture comprising

| | |
|---|---|
| 20% | p-trans-4-propylcyclohexyl-benzonitrile, |
| 28% | trans-1-p-methoxyphenyl-4-propylcyclohexane, |
| 23% | trans-1-p-ethoxyphenyl-4-propylcyclohexane, |
| 18% | trans-1-p-butoxyphenyl-4-propylcyclohexane and |
| 11% | 2-[trans-4-(p-pentylphenyl)-cyclohexyl]-5-(trans-4-pentylcyclohexyl)-trans-1,3-dioxane | exhibits c.p. 42°; $\Delta n$ 0.0861; thresh. 2.06 V; $T_{on}$ 153 msec and $T_{off}$ 28 msec.

EXAMPLE 28

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-bisphenyl, |
| 6% | 4-(trans-4-pentylcyclohexyl)-4'-(trans-4-propyl-cyclohexyl)-biphenyl and |
| 20% | 1-[trans-4-propylcyclohexyl)-cyclohexyl]-2-3-fluoro-4-cyanophenyl)-ethane | exhibits c.p. 75°; $\Delta n$ 0.1100; thresh. 1.52 V; $T_{on}$ 80 msec and $T_{off}$ 26 msec.

EXAMPLE 29

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl and |
| 20% | p-[trans-4-(trans-4-propylcyclohexyl)-cyclohexyl]-benzene | exhibits c.p. 63°; $\Delta n$ 0.0996; thresh. 2.05 V; $T_{on}$ 110 msec and $T_{off}$ 15 msec.

EXAMPLE 30

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-(bis-(trans-4-pentylcyclohexyl)-biphenyl, |
| 6% | 4-(trans-4-pentylcyclohexyl)-4'-(trans-4-propyl-cyclohexyl)-biphenyl and |
| 20% | 1-[trans-4-(trans-4-pentylcyclohexyl)-cyclohexyl]-2-(p-methoxyphenyl)-ethane | exhibits favorable switching times.

EXAMPLE 31

A mixture comprising

| | |
|---|---|
| 20% | p-trans-4-propylcyclohexyl-benzonitrile, |
| 20% | trans-1-p-methoxyphenyl-4-propylcyclohexane, |
| 15% | trans-1-p-ethoxyphenyl-4-propylcyclohexane, |
| 14% | trans-1-p-butoxyphenyl-4-propylcyclohexane, |
| 3% | 4,4'-bis-(trans-4-propylcyclohexyl)-biphenyl, |
| 2% | 4,4'-bis-(trans-4-pentylcyclohexyl)-biphenyl, |
| 6% | 4-(trans-4-pentylcyclohexyl)-4'-(trans-4-propyl-cyclohexyl)-biphenyl and |
| 20% | p-(trans-4-propylcyclohexyl)-phenyl trans,trans-4-propylcyclohexylcyclohexane-4'-carboxylate | exhibits c.p. 98°; $\Delta n$ 0.1082; thresh. 2.45 V; $T_{on}$ 115 msec and $T_{off}$ 13 msec.

EXAMPLE 32

A mixture comprising

| | |
|---|---|
| 20% | p-trans-4-propylcyclohexyl-benzonitrile, |
| 21% | trans-1-p-methoxyphenyl-4-propylcyclohexane, |
| 16% | trans-1-p-ethoxyphenyl-4-propylcyclohexane, |
| 15% | trans-1-p-butoxyphenyl-4-propylcyclohexane, |
| 20% | p-(trans-4-propylcyclohexyl)-phenyl trans,trans- |

| | |
|---|---|
| 8% | 4-propylcyclohexylcyclohexane-4'-carboxylate and p-pentylphenyl trans,trans-4-propylcyclohexyl-cyclohexane-4'-carboxylate | exhibits c.p. 82°; Δn 0.0982; thresh. 2.25 V; $T_{on}$ 128 msec and $T_{off}$ 18 msec.

EXAMPLE 33

A mixture comprising

| | |
|---|---|
| 11% | p-trans-4-propylcyclohexyl-benzonitrile, |
| 8% | 4-ethyl-4'-cyanobiphenyl, |
| 6% | 4-propyl-4'-cyanobiphenyl, |
| 4% | 3-fluoro-4-cyanophenyl p-propylbenzoate, |
| 4% | 3-fluoro-4-cyanophenyl p-pentylbenzoate, |
| 4% | 3-fluoro-4-cyanophenyl p-heptylbenzoate, |
| 19% | trans-1-p-methoxyphenyl-4-propylcyclohexane, |
| 5% | p-propylphenyl trans,trans-4-propylcyclohexyl-cyclohexne-4'-carboxylate, |
| 4% | p-pentylphenyl trans,trans-4-propylcyclohexyl-cyclohexane-4'-carboxylate, |
| 4% | p-pentylphenyl trans,trans-4-butylcyclohexyl-cyclohexane-4'-carboxylate, |
| 4% | p-propylphenyl trans,trans-4-butylcyclohexyl-cyclohexane-4'-carboxylate, |
| 5% | 1-[trans-4-(trans-4-propylcyclohexyl)-cyclohexyl]-2-(p-propylphenyl)-ethane, |
| 5% | 1-[trans-4-(trans-4-propylcyclohexyl)-cyclohexyl]-2-(p-pentylphenyl)-ethane, |
| 6% | p-trans-4-propyl-cyclohexylphenyl trans-4-butyl-cyclohexanecarboxylate, |
| 5% | p-trans-4-propyl-cyclohexylphenyl trans-4-pentyl-cyclohexanecarboxylate and |
| 6% | 4-(trans-4-pentylcyclohexyl)-4'-(trans-4-propyl-cyclohexyl)-2-fluorobiphenyl | exhibits c.p. 90°; Δn 0.1259; thresh. 1.8 V and favorable switching times.

EXAMPLE 34

A mixture comprising

| | |
|---|---|
| 12% | p-trans-4-propylcyclohexyl-benzonitrile, |
| 8% | p-trans-4-butylcyclohexyl-benzonitrile, |
| 13% | trans-1-p-ethoxyphenyl-4-propylcyclohexane, |
| 11% | trans-1-p-butoxyphenyl-4-propylcyclohexane, |
| 8% | trans-1-p-ethoxyphenyl-4-butylcyclohexane, |
| 9% | trans-1-p-methoxyphenyl-4-pentylcyclohexane, |
| 5% | trans-1-p-ethoxyphenyl-4-pentylcyclohexane, |
| 5% | p-propylphenyl trans,trans-4-propylcyclohexyl-cyclohexane-4'-carboxylate, |
| 5% | p-pentylphenyl trans,trans-4-propylcyclohexyl-cyclohexane-4'-carboxylate, |
| 5% | p-pentylphenyl trans,trans-4-butylcyclohexylcyclo-hexane-4'-carboxylate, |
| 5% | p-propylphenyl trans,trans-4-butylcyclohexyl-4'carboxylate, |
| 4% | 4,4'-bis-(trans-4-propylcyclohexyl)-biphenyl, |
| 5% | 4,4'-bis-(trans-4-pentylcyclohexyl)-biphenyl and |
| 5% | 4-(trans-4-pentylcyclohexyl)-4'-(trans-4-propyl-cyclohexyl)-biphenyl | exhibits c.p. 91°; Δn 0.1045, thresh. 2.2 V and favorable switching times.

EXAMPLE 35

A mixture comprising

| | |
|---|---|
| 5% | 3-fluoro-4-cyanophenyl p-ethylbenzoate, |
| 4% | 3-fluoro-4-cyanophenyl p-propylbenzoate, |
| 15% | trans-1-p-ethoxyphenyl-4-propylcyclohexane, |
| 13% | trans-1-p-butoxyphenyl-4-propylcyclohexane, |
| 10% | trans-1-p-ethoxyphenyl-4-butylcyclohexane, |
| 9% | trans-1-p-methoxyphenyl-4-pentylcyclohexane, |
| 10% | trans,trans-4-propyl-4'-propoxycyclohexylcyclo-hexane, |
| 5% | p-propylphenyl trans,trans-4-propylcyclohexyl-cyclohexane-4'-carboxylate, |
| 5% | p-pentylphenyl trans,trans-4-propylcyclohexyl-cyclohexane-4'-carboxylate, |
| 5% | p-pentylphenyl trans,trans-4-butylcyclohexyl-cyclohexane-4'-carboxylate, |
| 5% | p-propylphenyl trans,trans-4-butylcyclohexyl-cyclohexane-4'-carboxylate, |
| 4% | 4,4'-bis-(trans-4-propylcyclohexyl)-biphenyl, |
| 5% | 4,4'-bis-(trans-4-pentylcyclohexyl)-biphenyl and |
| 5% | 4-(trans-4-pentylcyclohexyl)-4'-(trans-4-propyl-cyclohexyl)-biphenyl | exhibits c.p. 90°, Δn 0.1012, thresh. 2.6 V and favorable switching times.

EXAMPLE 36

A mixture comprising

| | |
|---|---|
| 15% | p-trans-4-propylcyclohexyl-benzonitrile, |
| 10% | p-trans-4-butylcyclohexyl-benzonitrile, |
| 11% | trans-1-p-ethoxyphenyl-4-propylchclohexane, |
| 6% | trans-1-p-butoxyphenyl-4-propylchclohexane, |
| 14% | trans,trans-4-propyl-4'-propoxycyclohexylcyclohexane, |
| 6% | trans,trans-4-pentyl-4'-methoxycyclohexylcyclohexane, |
| 12% | trans,trans-4-pentyl-4'-ethoxycyclohexylcyclohexane, |
| 4% | 4,4'-bis-(trans-4-propylcyclohexyl)-biphenyl, |
| 4% | 4,4'-bis-(trans-4-propylcyclohexyl)-2-fluoro-biphenyl, |
| 4% | 4,4'-bis-(trans-4-pentylcyclohexyl)-2-fluorophenyl, |
| 5% | 4-(trans-4-pentylcyclohexyl)-4'-(trans-4-propyl-cyclohexyl)-biphenyl and |
| 5% | 4-(trans-4-pentylcyclohexyl)-4'-(trans-4-propyl-cyclohexyl-2-fluorobiphenyl | exhibits c.p. 90°, Δn 0.1003, thresh. 2.4 V and favorable switching times.

We claim:

1. A TFT-addressed electrooptical LC display element containing a dielectric with a positive dielectric anisotropy and being based on a TN cell having a short switch-on time $T_{on}$ when the voltage is switched from a first voltage below or approximately at the threshold voltage to a second voltage on the increase of the electrooptical characteristic line, said dielectric consisting essentially of at least one component of formula I $$R^1-A^1-Z^1-A-O-R^2$$

wherein
$R^1$ and $R^2$, independently of one another, are each alkyl having 1 to 9 C atoms, in which, in addition, one or two $CH_2$ groups may be replaced by $-CH=CH-$, or one of the two groups $R^1$ and $R^2$ is H, and $R^2$ may be $C_{1-5}$-straight chain alkanoyl,
$Z^1$ is $-CH_2-O-$, $-OCH_2$, $-CH_2CH_2-$ or a single bond,
$A^1$ is trans-1,4-cyclohexylene in which, in addition, one or two nonadjacent $CH_2$ groups may be replaced by O and/or S, or 1,4-cyclohexenylene, and
A is unsubstituted or fluorine-substituted 1,4-phenylene,
at least one component of formula II $$R^3-A^2-Z^2-A^3-Z^3-A'-R^4 \quad \text{II}$$

wherein

R³ is H or alkyl having 1 to 9 C atoms, in which, in addition, one or two nonadjacent CH₂ groups may be replaced by —O—, —CO—, —O—CO—, —CO—O— and/or —CH=CH—, R⁴ is H, alkyl having 1 to 9 C atoms in which, in addition, one or two nonadjacent CH₂ groups may be replaced by —O—, —CO—, —O—CO—, —CO—O— and/or —CH=CH—, halogen, NCS or N₃, Z² and Z³ are each —CH₂CH₂—, —OCH₂—, —CH₂O—, —O—CO—, —CO—O—, or a single bond, A² and A³ are each trans-1,4-cyclohexylene in which, in addition, one or two nonadjacent CH₂ groups may be replaced by O and/or S, optionally a component of formula IV $$R^3—A^2—Z^2—A^3—(Z^4—A^4)_m—Z^3—A'—(Z^5—A^5)_n—R^4 \quad IV$$

wherein

Z⁴ and Z⁵ are each —CH₂CH₂—, —OCH₂—, —CH₂O—, —O—CO—, —CO—O— or a single bond,

A⁴ and A⁵ are each trans-1,4-cyclohexylene or unsubstituted or fluorine-substituted 1,4-phenylene in which, in addition, one or two CH groups may be replaced by N, m and n are each 0 or 1 and (m+n) is 1, A' is unsubstituted or fluorine-substituted 1,4-phenylene in which, in addition, one or two CH groups may be replaced by N, and R³, R⁴, A², A³, Z² and Z³ have the meaning given above.

2. A display element according to claim 1, wherein the dielectric contains one or more compounds selected from the group consisting of compounds of the formulae Ia to Id:

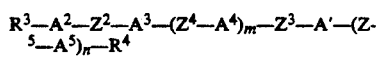

Ia

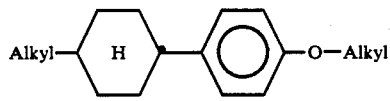

Ib

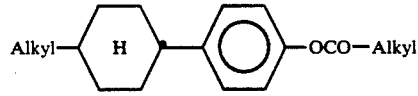

Ic and

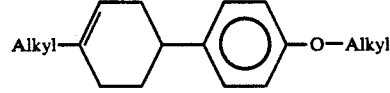

Id wherein alkyl is in each case a straight-chain alkyl group having 1 to 5 C atoms.

3. A display element according to claim 1, wherein the dielectric contains one or more compounds selected from the group consisting of compounds of formulae IIa to IIv:

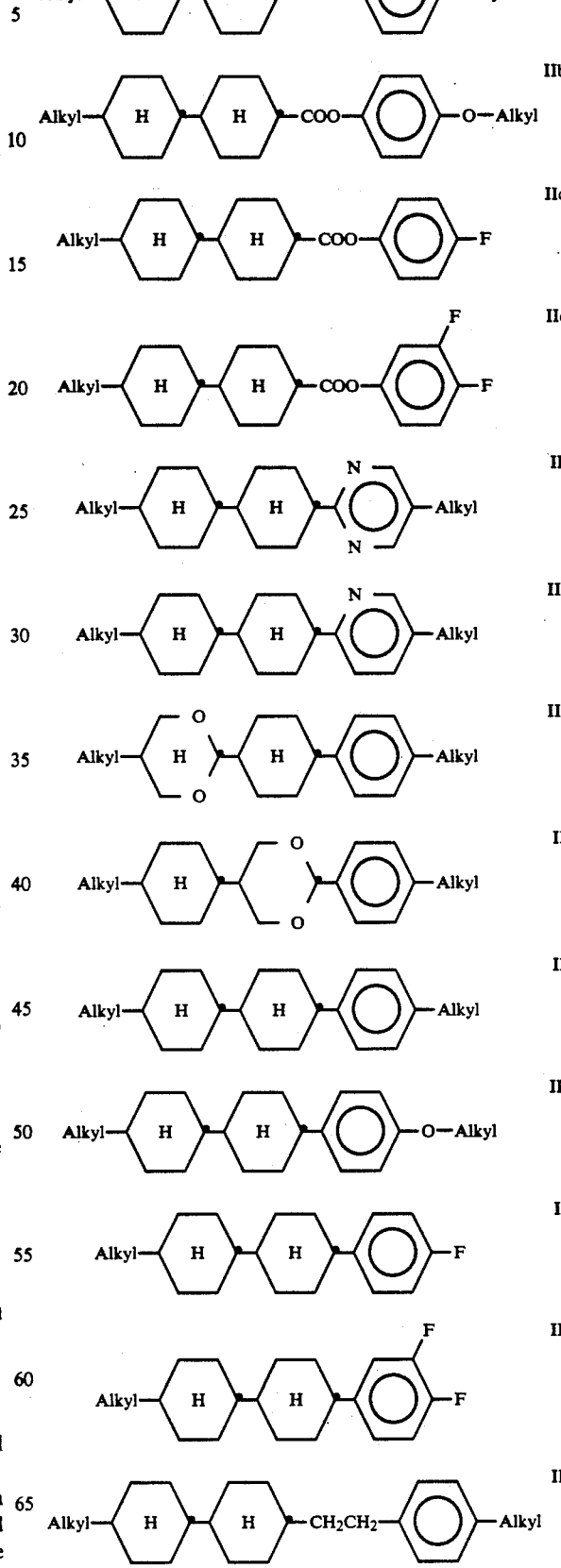

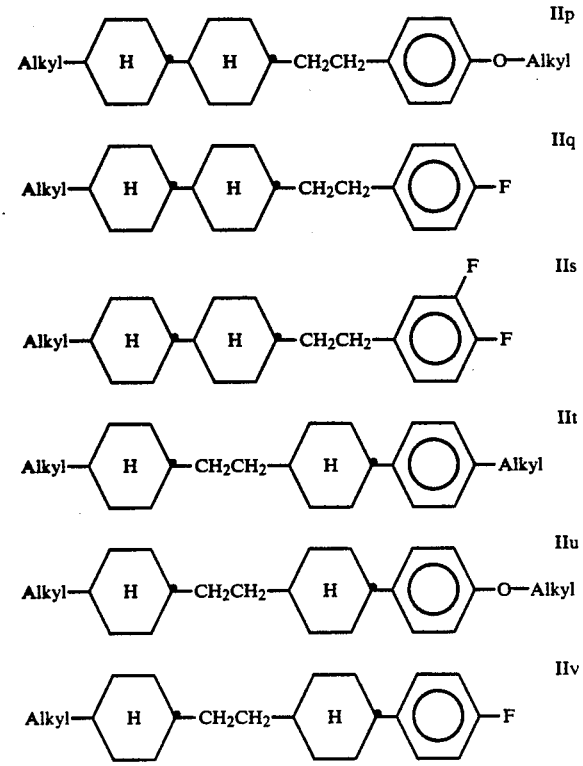

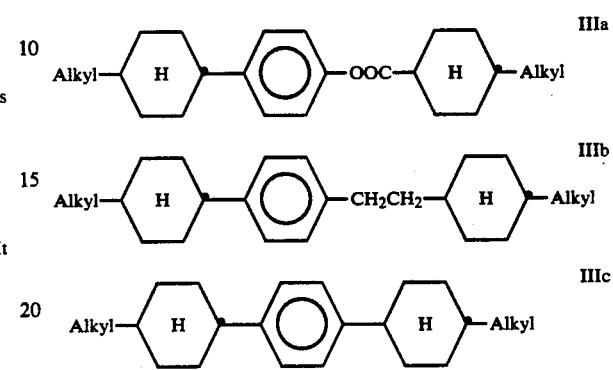

wherein alkyl is in each case a straight-chain alkyl group having 1 to 5 C atoms.

4. A display element according to claim 1, wherein, in addition to compounds of formula I, II and optionally IV, the dielectric contains one or more compounds selected from the group consisting of compounds of formulae IIIa to IIIc:

wherein alkyl is in each case a straight-chain alkyl group having 1 to 5 C atoms.

5. A display element according to claim 1, wherein the dielectric contains one or more compounds selected from the group consisting of formulae

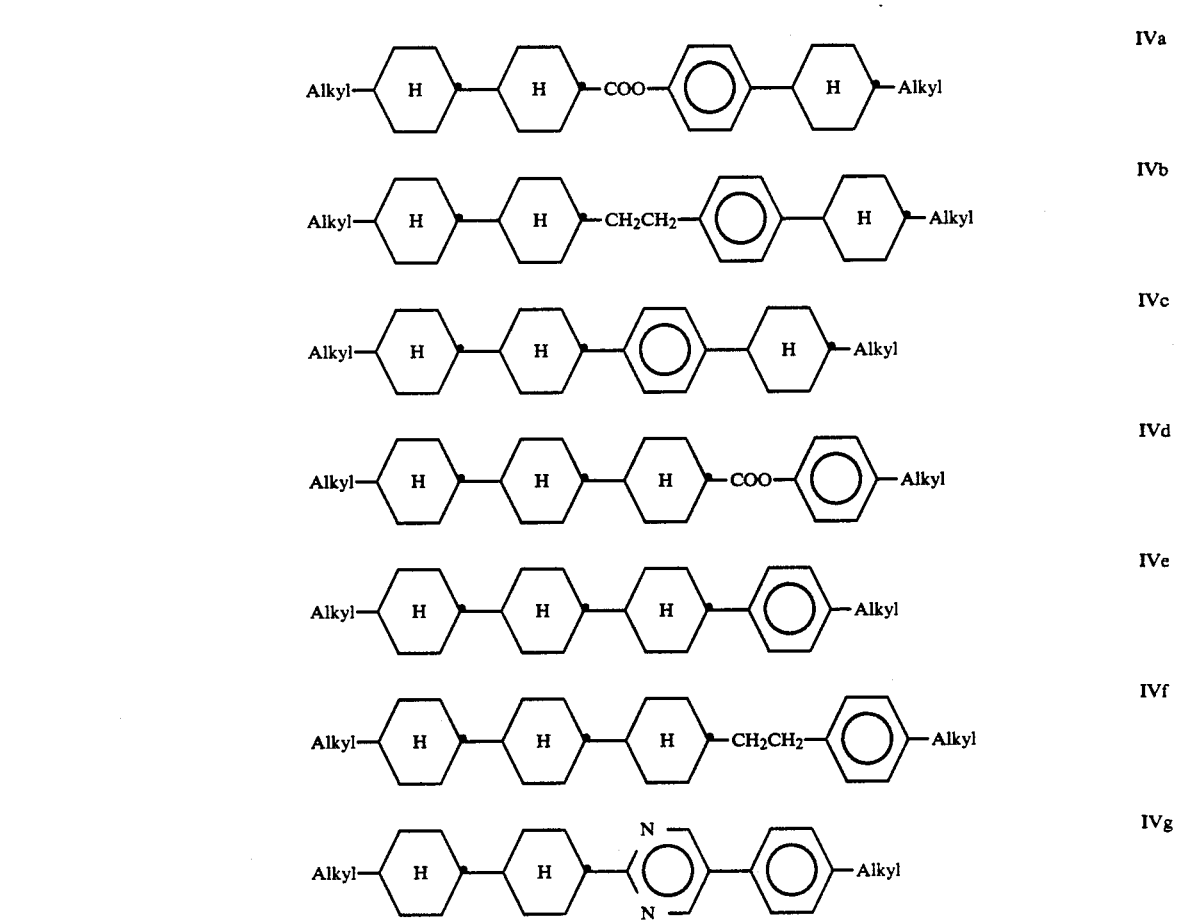

-continued

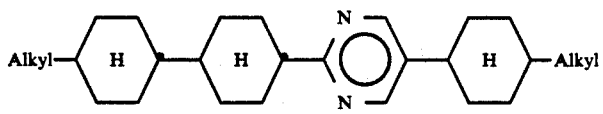 IVh

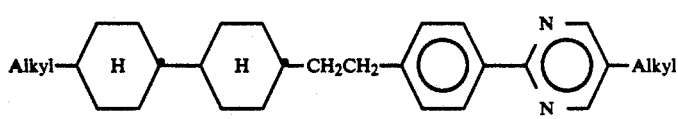 IVi

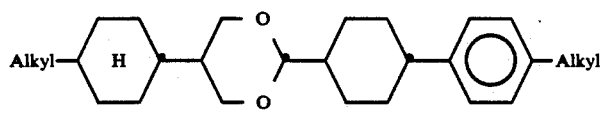 IVj

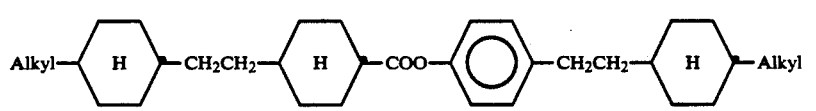 IVk wherein alkyl is in each case a straight-chain alkyl group having 1 to 5 C atoms.

6. A display element according to claim 1, wherein the dielectric contains one or more compounds selected from the group consisting of compounds of formulae Va to Ve in an amount not more than 40%:

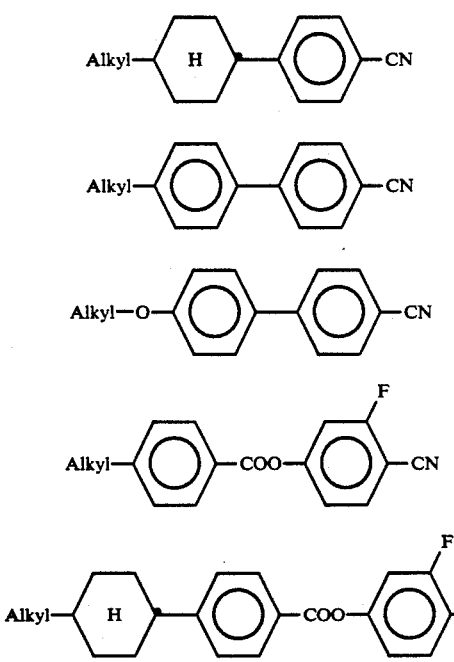

wherein alkyl is in each case a straight-chain alkyl group having 1 to 5 C atoms.

7. An electrooptical display element according to claim 1, wherein operation is in the first transition minimum according to Gooch-Tarry.

8. A display element according to claim 1, wherein $R^1$ and $R^2$ are each independently alkyl in which a $CH_2$ group not linked directly to —O— or —$A^1$— may be replaced by —O— or —CH=CH—.

9. A display element according to claim 1, wherein $R^1$ and $R^2$ are each independently straight-chain $C_{1-5}$-alkyl.

10. A display element according to claim 1, wherein $R^2$ is straight-chain $C_{1-5}$-alkanoyl.

11. A display element according to claim 1, wherein $R^2$ is straight-chain $C_{2-5}$-alkanoyl.

12. A display element according to claim 1, wherein, in addition to compound of formula I, II and optionally IV, the dielectric contains at least one of

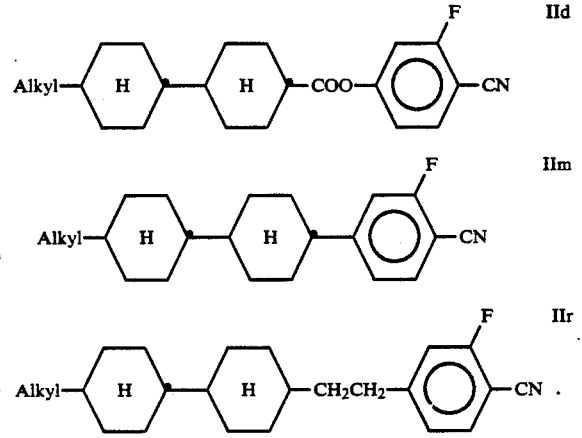

13. A process for shortening the switch-on time $T_{on}$ of TFT-addressed electrooptical LC display elements based on a TN cell when the voltage is switched from a first voltage below or approximately at the threshold voltage to a second voltage on the increase of the electrooptical characteristic line, comprising using in the dielectric at least one component of the formula I $$R^1-A^1-Z^1-A-O-R^2$$

wherein
$R^1$ and $R^2$, independently of one another, are each alkyl having 1 to 9 C atoms, in which, in addition, one or two $CH_2$ groups may be replaced by —CH=CH—, or one of the two groups $R^1$ and $R^2$ is H, and $R^2$ may be $C_{1-5}$-straight-chain alkanoyl,
$Z^1$ is —$CH_2$—O—, —O$CH_2$—, —$CH_2CH_2$— or a single bond,
$A^1$ is trans-1,4-cyclohexylene in which, in addition, one or two nonadjacent $CH_2$ groups may be replaced by O and/or S, or 1,4-cyclohexenylene, and A is unsubstituted or fluorine-substituted 1,4-phenylene, and at least one component of formula II $$R^3-A^2-Z^2-A^3-A'-R^4 \qquad \text{II}$$

wherein

R$^3$ is H or alkyl having 1 to 9 C atoms, in which, in addition, one or two nonadjacent CH$_2$ groups may be replaced by —O—, —CO—, —O—CO—, —CO—O— and/or —CH=CH—, R$^4$ is H, alkyl having 1 to 9 C atoms in which, in addition, one or two nonadjacent CH$_2$ groups may be replaced by —O—, —CO—, —O—CO—, —CO—O— and/or —CH=CH, halogen, NCS or N$_3$, Z$^2$ and Z$^3$ are each —CH$_2$CH$_2$—, —OCH$_2$—CH$_2$O—, —O—CO—, —CO—O—, or a single bond, A$^2$ and A$^3$ are each trans-1,4-cyclohexylene in which, in addition, one or two nonadjacent CH$_2$ groups may be replaced by O and/or S, optionally a component of formula IV $$R^3-A^2-Z^2-A^3-(Z^4-A^4)_m-Z^3-A'-(Z^5-A^5)_n-R^4 \qquad \text{IV}$$

wherein

Z$^4$ and Z$^5$ are each —CH$_2$CH$_2$—, —OCH$_2$—CH$_2$O—, —O—CO—, —CO—O— or a single bond, A$^4$ and A$^5$ are each trans-1,4-cyclohexylene or unsubstituted or fluorine-substituted 1,4-phenylene in which, in addition, one or two CH groups may be replaced by N, A' is unsubstituted or fluorine-substituted 1,4-phenylene in which, in addition, one or two CH groups may be replaced by N, and m and n are each 0 or 1 and (m+n) is 1.

* * * * *